(12) United States Patent
Lumley et al.

(10) Patent No.: US 6,716,015 B2
(45) Date of Patent: Apr. 6, 2004

(54) DISTRIBUTION SYSTEM FOR A PASTILLATION MACHINE

(75) Inventors: Patrick Mitchell Howard Lumley, Calgary (CA); Donald Valentine Joseph Lomenda, Calgary (CA); Charles Leo O'Donnell, Calgary (CA)

(73) Assignee: Enersul, Inc., Calgary (CA)

( * ) Notice: Subject to any disclaimer, the term of this patent is extended or adjusted under 35 U.S.C. 154(b) by 151 days.

(21) Appl. No.: 09/995,243

(22) Filed: Nov. 26, 2001

(65) Prior Publication Data

US 2003/0099733 A1 May 29, 2003

(51) Int. Cl.[7] .............................. B29B 9/10; B29C 47/32
(52) U.S. Cl. ............... 425/192 R; 425/294; 425/382 R; 425/310; 425/198
(58) Field of Search ........................ 425/6, 8, 198, 425/192 R, 194, 196, 190, 294, 382 R, 463, 464, 447, 310, 192; 264/8, 13

(56) References Cited

U.S. PATENT DOCUMENTS

| | | | | |
|---|---|---|---|---|
| 4,029,459 A | * | 6/1977 | Schmiedeke | 425/202 |
| 4,623,307 A | | 11/1986 | Froeschke | 425/8 |
| 5,013,498 A | * | 5/1991 | Froeschke | 264/8 |
| 5,286,181 A | * | 2/1994 | Schwager | 425/8 |
| 5,332,378 A | * | 7/1994 | Harreither | 425/8 |
| 5,382,145 A | * | 1/1995 | Harreither | 425/8 |
| 5,395,560 A | * | 3/1995 | Schwager | 264/8 |
| 5,492,463 A | * | 2/1996 | Schwager | 425/8 |
| 5,643,524 A | * | 7/1997 | Gilbert De Cauwer et al. | 264/441 |
| 5,694,834 A | * | 12/1997 | Le Dall et al. | 99/353 |
| 5,723,153 A | * | 3/1998 | Schwager | 425/8 |
| 6,412,308 B1 | * | 7/2002 | Lewis et al. | 65/267 |

FOREIGN PATENT DOCUMENTS

DE 3530508 A1 * 3/1987

* cited by examiner

*Primary Examiner*—Robert Davis
*Assistant Examiner*—Joseph S. Del Sole
(74) *Attorney, Agent, or Firm*—Swanson & Bratschun, LLC

(57) ABSTRACT

In a pastillation machine, an improved distribution system is provided. The distribution system comprises: a distribution bar having a bore extending therethrough, a series of holes located on an inlet surface of the bar, a series of slots located on an outlet surface of the bar, and a diffuser located in the bore of the bar, the diffuser being spaced between the inlet surface and the outlet surface. The series of holes of the distribution system aligns with flowable substance outlets of the pastillation machine. The pastillation machine can be used to form various hot liquid mixtures, including elemental sulphur and sulphur based fertilizers containing swelling clay matrix, and macronutrients (N, P, K) and micronutrients (Fe, Cu, Zn, Mn etc.).

13 Claims, 7 Drawing Sheets

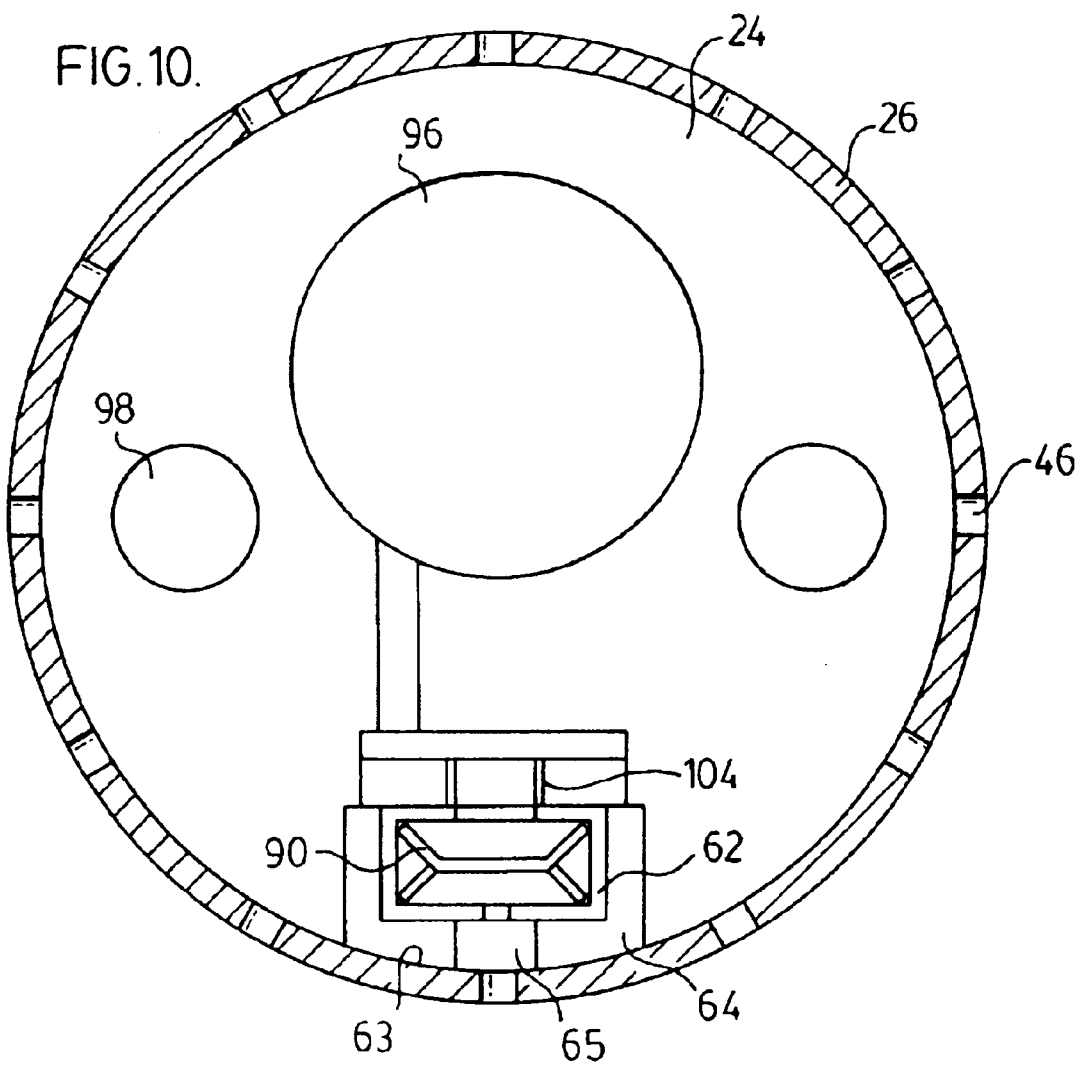

DISTRIBUTION SYSTEM FOR A PASTILLATION MACHINE

FIELD OF THE INVENTION

The present invention relates to an improved distribution system for use in a pastillation machine, and more particularly, a distribution system that provides for an essentially even distribution of a flowable substance at the outlet thereof.

BACKGROUND OF THE INVENTION

Pastillation machines typically include an inner cylinder that receives a flowable substance from a source. An outer cylinder rotates about the inner cylinder and has rows of openings formed therein. The flowable substance is delivered under pressure from the inner cylinder, through the rows of openings in the outer cylinder. The flowable substance is then dropped onto a moving conveyor device and cooled to form hemispherical pastilles. Pastillation machines are particularly useful for forming elemental sulphur and sulphur based fertilizer pastilles.

A distribution bar for a machine for extruding flowable substances is disclosed in U.S. Pat. No. 4,623,307 to Froeschke. The distribution bar is located in a groove that is formed in the outer surface of the inner cylinder of the machine. The distribution bar has a series of inlet holes that receive the flowable substance from the inner cylinder. The flowable substance passes through these inlet holes into an elongated slot that is formed along the length of the distribution bar. The slot is located adjacent to the inner wall of the outer cylinder. The holes of the distribution bar are placed very close together in an attempt to distribute the flowable substance evenly within the elongated slot of the distribution bar.

Even distribution of the flowable substance is an important consideration, in order for the flowable substance to be forced out through the holes of the outer cylinder evenly and thus, to form pastilles that are similar in size. The many holes in the distribution bar of the prior art are subject to clustering and agglomeration of the flowable substance, which results in product of inferior quality and inconsistent sizing. The holes also require frequent cleaning in order to minimize the clustering and agglomeration of the flowable substance, which results in increased equipment downtime.

Pasitllation machines typically operate at high temperatures in order to keep the hot liquid flowable. At such temperatures, the distribution bar is subjected to heat stress, which may cause the distribution bar to lose its seal with the flowable substance inlet holes. In addition, warping of the distribution bar causes uneven wear, particularly on the surface of the distribution bar that is in constant contact with the rotating outer cylinder. More importantly, the warped distribution bar may score the outer cylinder. The outer cylinder is an expensive component to replace and therefore any unnecessary wear on the outer cylinder is undesirable.

It is therefore an object of an aspect of the present invention to provide a distribution system that improves the distribution of the flowable substance at an outlet thereof.

SUMMARY OF THE INVENTION

According to one aspect of the present invention there is provided in a pastillation machine, an improved distribution system for a flowable substance to be formed into pastilles. The distribution system comprises: a bar having a bore extending therethrough, a series of holes located on an inlet surface of the bar, a series of slots located on an outlet surface of the bar, and a diffuser located in the bore of the bar, the diffuser being spaced between the inlet surface and the outlet surface wherein the series of holes is aligned with flowable substance outlets of the pastillation machine.

According to another aspect of the present invention there is provided a diffuser for a distribution system for use in a pastillation machine. The diffuser comprises: an elongate body sized to fit into a bore of the distribution bar, and a centering device coupled to the elongate body for engaging at least one surface of the bore of the distribution bar wherein the centering device maintains the elongate body generally spaced from at least one wall of the bore of a distribution bar of the distribution system.

According to yet another aspect of the present invention there is provided a pastillation machine. The machine comprises: a first cylinder having a first end and a second end and an outer surface, the first cylinder being supported at the first end and the second end, a cavity formed in the first cylinder, the cavity being in communication with a source of a flowable substance, a slot formed in the outer surface of the first cylinder, the slot being located between the first end and the second end, fluid outlets located in the slot, the outlets being in communication with the cavity of the first cylinder, a second cylinder surrounding the first cylinder and being rotatable thereon, the second cylinder having rows of openings therein, a distribution bar sized to fit into the slot and being sandwiched between the inner cylinder and the outer cylinder, the distribution bar having an inlet surface and an outlet surface and a bore extending therethrough, a series of holes located on the inlet surface, the holes being aligned with the fluid outlets of the first cylinder for receiving the flowable substance therefrom, a series of slots located on the outlet surface, the series of slots of the distribution bar being in communication with the rows of openings in succession, and a diffuser located between the inlet surface and the outlet surface, the diffuser bar extending axially through the bore of the distribution bar wherein as the openings of the outer cylinder pass over the series of slots of the distribution bar, a predetermined amount of flowable substance passes through the openings and drops onto a moving conveyor located below the pastillation machine.

It is an advantage of an aspect of the present invention that the distribution system distributes essentially evenly the flowable substance to produce hemispherical pastilles having similar size.

BRIEF DESCRIPTION OF THE DRAWINGS

Embodiments of the present invention will now be described more fully with reference to the accompanying drawings in which:

FIG. 10 is a cross-sectional view of the machine of FIG. 3.

DETAILED DESCRIPTION OF THE PREFERRED EMBODIMENT

Pastillation machines are used to convert hot liquid mixtures such as molten elemental sulphur, for example, into tiny essentially hemispherical, solid pastilles. The hot liquid mixture is deposited as droplets onto a moving conveyor and the droplets are subsequently cooled to form solid pastilles. Pastilles can be formed from virtually any hot liquid mixture including viscous fluids, semi-solid slurries, molten materials, fertilizers, chocolates, waxes, resins and other flowable industrial products. Pastillation machines are also referred to as drop forming or Rotoformer™ machines of Sandvik Process Systems.

A preferred application of pastillation machines is the production of elemental sulphur pastilles and fertilizer pastilles such as those containing elemental sulphur and swelling clay matrix, and marconutrients (N, P, K) and micronutrients (Fe, Cu, Zn, Mn etc.).

Figure 1:
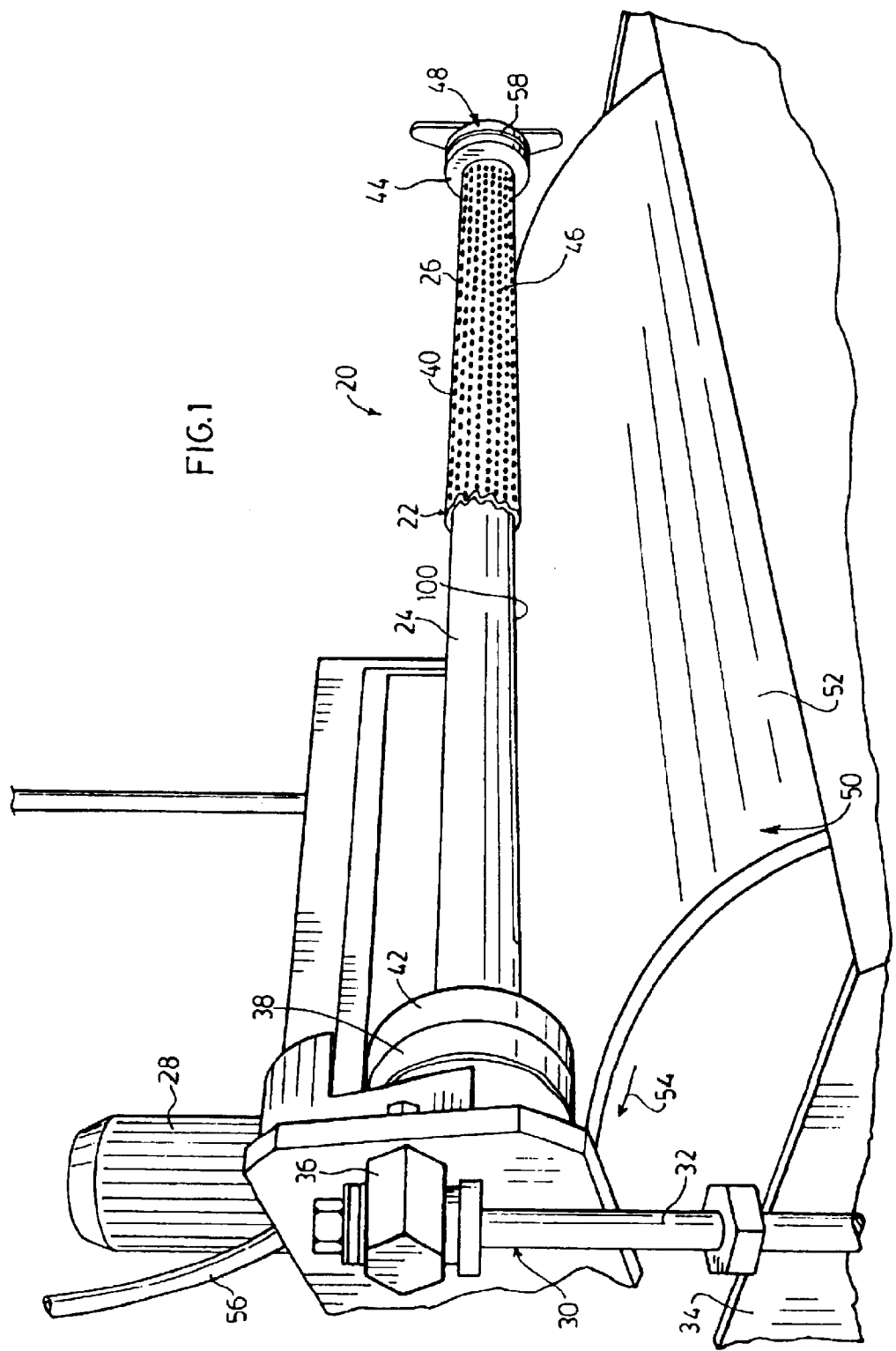
FIG. 1 is a perspective view of parts of a pastillation machine with an outer cylinder partially cut away.

Referring to FIG. 1, a pastillation machine 20 is generally shown. The machine 20 comprises a double cylinder assembly 22 having an inner cylinder 24 that is surrounded by a rotatable outer cylinder 26. The double cylinder assembly 22 is supported at a first end by a first support assembly 30 and at a second end by a second support assembly (not shown).

First support assembly 30 comprises a strut 32 that extends upwardly from a machine housing 34. A horizontal support 36 joins strut 32 to a bearing housing 38. Bearing housing 38 has a sprocket (not shown) connected thereto that cooperates with a pulley arrangement (not shown). A motor 28, typically 5 HP, drives the pulley arrangement. The inner cylinder 24 is supported by the bearing housing 38 and extends horizontally therefrom in a cantilevered arrangement. The inner cylinder 24 is stationary and does not rotate.

The outer cylinder 26 is driven by the motor 28 to rotate about the inner cylinder 24. The outer cylinder 26 is axially slidable onto the inner cylinder 24 from the second end. The outer cylinder 26 includes a perforated shell 40 having enlarged end pieces 42 and 44, that are located at the first and second ends of the shell 40 respectively. The enlarged end piece 42 is formed to engage the bearing housing 38 so that the rotation created by motor 28 is transferred to the outer cylinder 26.

A spring loaded tension plate, supported by a cradle (not shown) is coupled to the second end of the double cylinder assembly 22. Tension plate 48 also includes a second bearing housing 58. Second bearing housing 58 allows the outer cylinder 26 to rotate about the inner cylinder 24. Tension plate 48 provides a seal at the second end of the double cylinder assembly 22 to prevent any flowable substance from escaping. Tension plate 48 rests on the cradle when it is installed, which provides support to the second end of the double cylinder assembly 22.

The pastillation machine further comprises a conveyor device 50. The conveyor device 50 includes a conveyor belt 52, which is located below the double cylinder assembly 22. The conveyor belt 52 is formed of stainless steel and moves in the direction indicated by arrow 54. A cooling device (not shown) is located downstream of the double cylinder assembly 22. The cooling device is typically comprised of a water jet that sprays the underside of the conveyor belt 52. The conveyor belt 52 is constructed of stainless steel in order to conduct the cooling effect of the water spray, however, the conveyor may be constructed of any material that is highly heat conductive.

A flowable substance source (not shown) is connected to a pipeline 56. The flowable substance in a preferred embodiment is a liquid sulphur based fertilizer. The pipeline 56 is coupled to the inner cylinder 24 and delivers the flowable substance thereto under pressure. The flowable substance passes from the inner cylinder through momentarily aligned openings 46 that are formed in rows about the circumference of the perforated shell 40 of the outer cylinder. Droplets (not shown) of the flowable substance fall from the outer cylinder 26 once the momentary opening 46 is closed and are deposited onto the moving conveyor belt 52. The droplets subsequently travel past the cooling device to form hemispherical solid pastilles (not shown).

In the operating condition, the inner cylinder 24 is oriented so that a channel 100, which is formed in the outer surface thereof, is directed downwardly towards the conveyor device 50.

Figure 2:
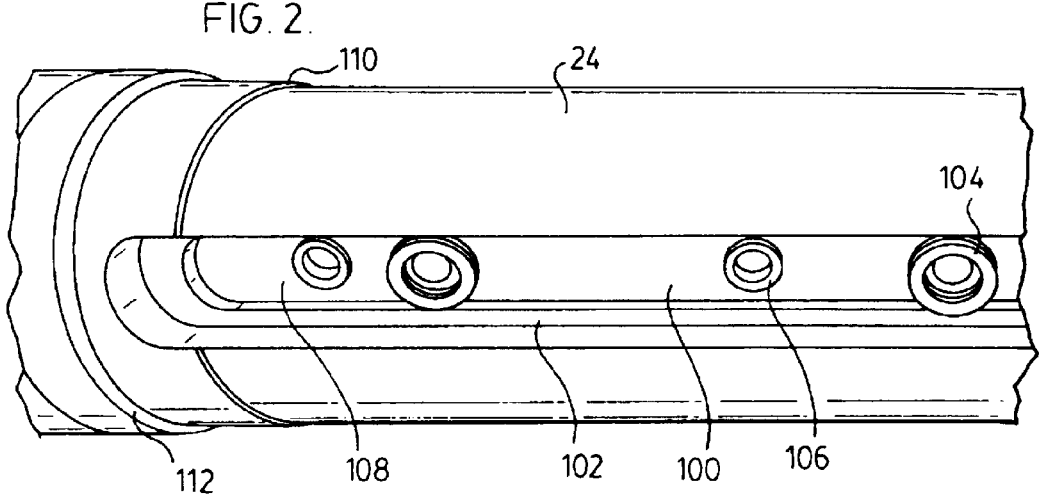
FIG. 2 is a perspective bottom view of a portion of the machine of FIG. 1.

Referring to FIG. 2, details of the inner cylinder 24 are shown. The channel 100 of the inner cylinder 24 includes a generally planar base 108 that is surrounded by a ridge 102 having a generally planar surface. A series of flowable substance outlets 104 project from the base 108 of the channel 100. Each outlet 104 has a spring located therein, which is biased radially outward. The outlets 104 expel the flowable substance that is fed into the inner cylinder 24 from the flowable substance source.

Adjacent each outlet 104 is an alternate outlet 106. The alternate outlets 106 function the same way as the outlets 104, however, in this embodiment, the alternate outlets 106 have been plugged.

The outer surface of the inner cylinder 24 has a first step 110 and a second step 112 formed therein. The second step 112 is slightly larger in size and is located adjacent the first end of the inner cylinder 24. The steps 110 and 112 engage complementing steps formed on the inner surface of the outer cylinder 26 and serve to locate the outer cylinder 26 axially on the inner cylinder 24.

Figure 3:
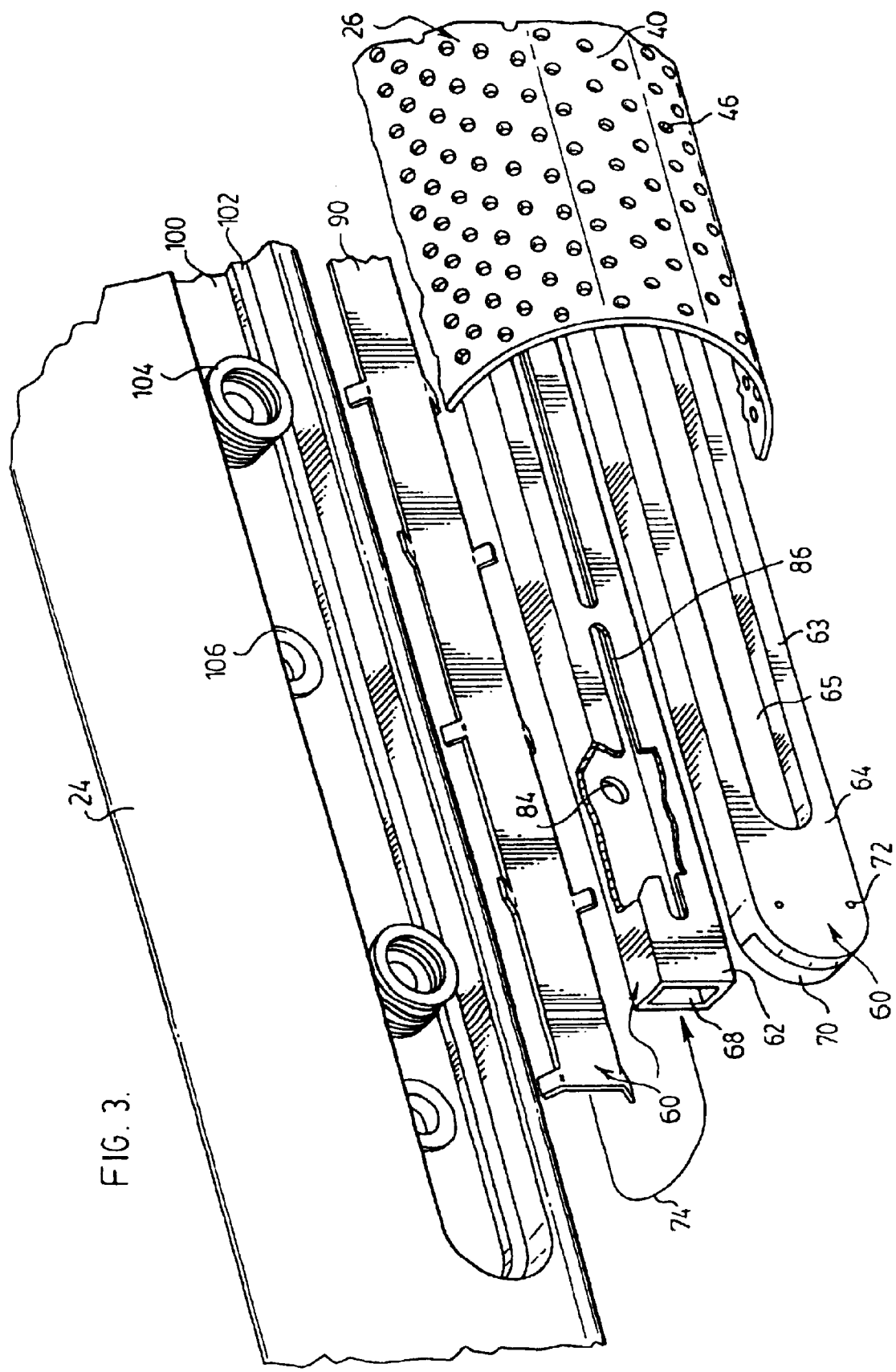
FIG. 3 is an exploded view of portions of the machine of FIG. 1 incorporating a distribution system of the present invention.
Figure 4:
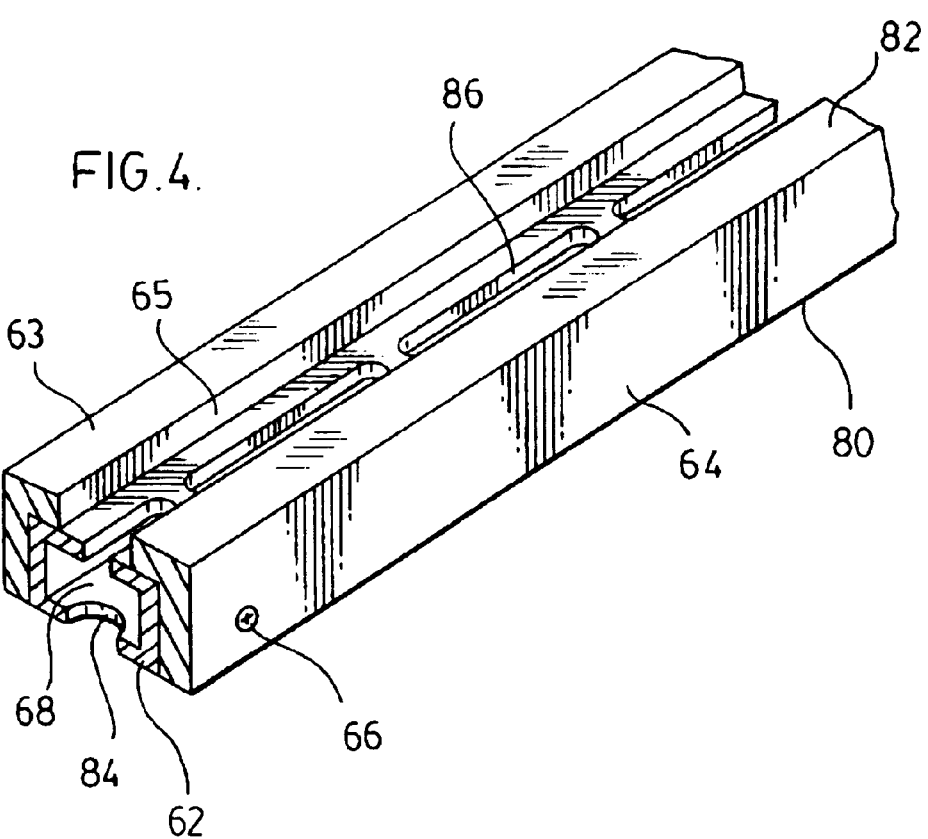
FIG. 4 is an isometric view of a portion of the distribution system of FIG. 3.

Referring to FIG. 3, a distribution system 60 including a diffuser bar 90 is shown. The distribution system 60 is sized to fit into the channel 100 of the inner cylinder 24. In the assembled condition, the diffuser 90 fits inside the distribution system 60 and the outer cylinder 26 sandwiches the distribution system 60 between itself and the inner cylinder 24. In this arrangement, the flowable substance flows out of the outlets 104, through the distribution system 60 and out of openings 46 of the perforated shell 40 of the outer cylinder 26.

Distribution system 60 is comprised of a distribution bar 62 having a bore 68, that extends therethrough, and a feeder bar 64. The distribution bar 62 and feeder bar 64 are coupled together as shown in FIGS. 4–7. The feeder bar 64 is secured to the distribution bar 62 by fasteners 66. Alternatively, the feeder bar 64 is secured to the distribution bar 62 by welding or any other suitable attachment means.

The construction of the distribution bar 62 and feeder bar 64 of the distribution system 60 provides a tolerance for heat expansion so that warping of the distribution system 60 is kept to a minimum. The distribution bar 62 is made of stainless steel. This material is preferred because it provides high corrosion resistance and low thermal expansion. Type 316 stainless steel is preferred, however, any material exhibiting the desired properties could also be used.

The feeder bar 64 is subject to increased wear due to constant contact with the outer cylinder 26 as it rotates. In order to ensure that the feeder bar 64 wears and the outer cylinder 26 does not, the feeder bar 64 is made of a ductile material. The construction of the distribution system 60 allows for replacement of only the feeder bar 64, once it has been sufficiently worn, rather than the entire distribution system 60. The feeder bar 64 could alternatively be made of carbon steel, cast iron, aluminum or any material that wears faster than outer rotating cylinder 26.

The distribution system 60 has an inlet surface 80 and an opposing outlet surface 82. The inlet surface 82 is located on a side of the distribution bar 62 and comprises a series of holes 84 that are spaced along the length thereof. The outlet surface 82 is located on an opposing side of the distribution bar 62 and has a series of slots 86 that are spaced along the length thereof. The feeder bar 64 has a wear surface 63 that is curved slightly to complement the curvature of the inner wall of the outer cylinder 26. A continuous slot 65 extends along the length of the feeder bar 64 and exposes the series of slots 86 of the distribution bar 62. Continuous slot 65 is wider than series of slots 86 and provides a reservoir for containing the flowable substance prior to extrusion of the substance through the rows of openings 46.

It will be understood by a person skilled in the art that the series of holes 84 and series of slots 86 do not need to be on opposite surfaces of the distribution bar 62. A path between the holes 84 to the slots 86 must be established, however, the actual location of the holes 84 and slots 86 is not important. In a preferred embodiment, the holes 84 and slots 86 are on opposite surfaces of the distribution bar 62.

Figure 5:
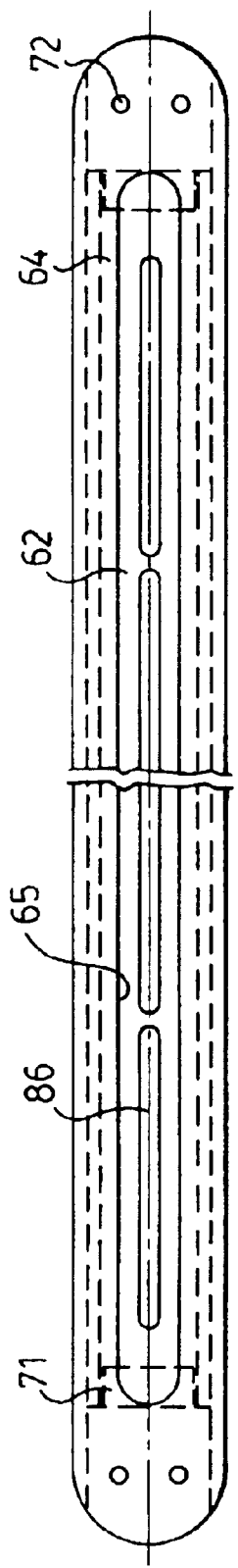
FIG. 5 is top view of a portion of the distribution system of FIG. 3.
Figure 6:
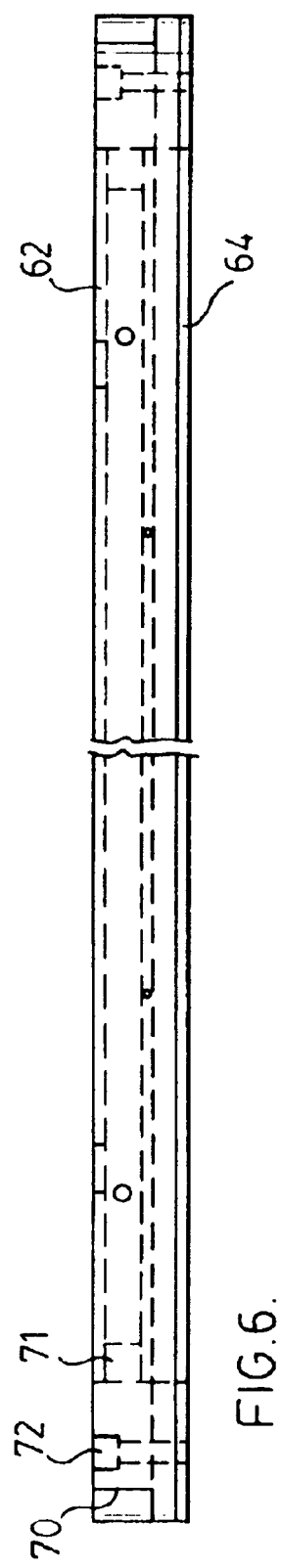
FIG. 6 is a side view of a portion of the distribution system of FIG. 3.
Figure 7:
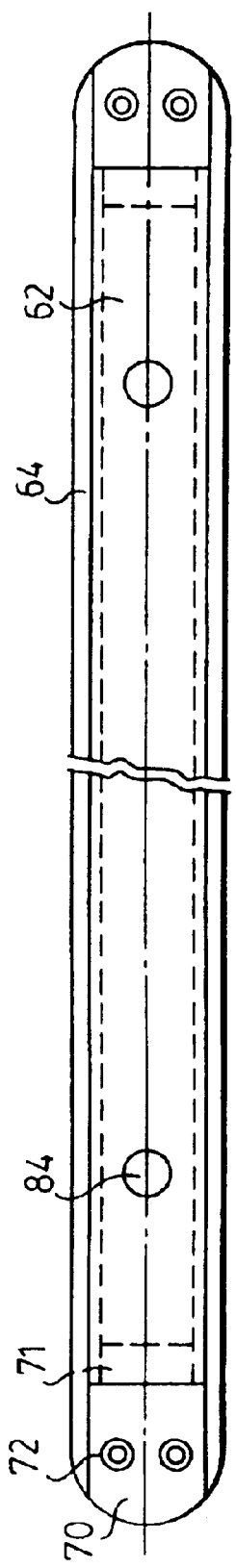
FIG. 7 is a bottom view of a portion of the distribution bar of FIG. 3.
Figure 8:
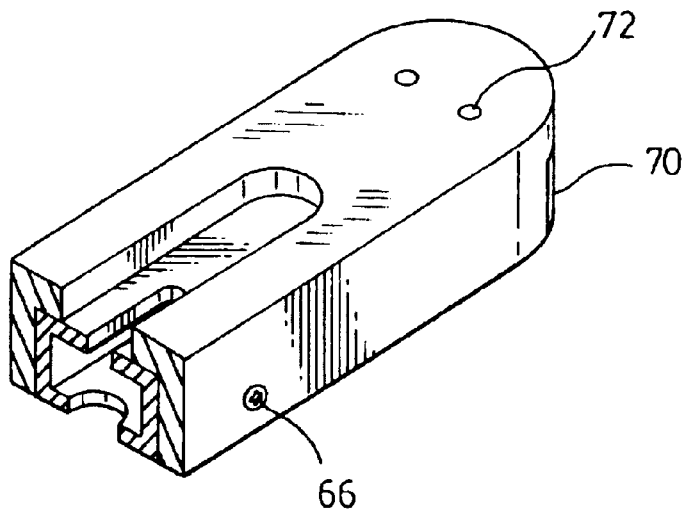
FIG. 8 is an isometric view of an end piece of the distribution system.

Referring to FIGS. 5, 6 and 7, an end portion of the distribution bar 62 and feeder bar 64 assembly is shown. An end piece 70 of the feeder bar 64 is located at the distal end of the feeder bar 64. Referring also to FIGS. 5–7, end pieces 70 are located at opposite ends of the feeder bar 60 and are removable to allow for the diffuser 90 to slide into the distribution bar 62 in order to assemble the distribution system 60. An insert 71 projects from each end piece 70 to plug into an end of bore 68 of the distribution bar 62. The insert 71 helps to secure the end piece 70 in place and additionally provides a seal so that flowable substance does not escape from the ends of the distribution bar 62. Fasteners are located through countersunk apertures 72 for securing the end pieces 70 to the feeder bar 64.

In an alternate embodiment of the distribution and feeder bars 62 and 64, the bars may be integrated to form a single part.

Figure 9:
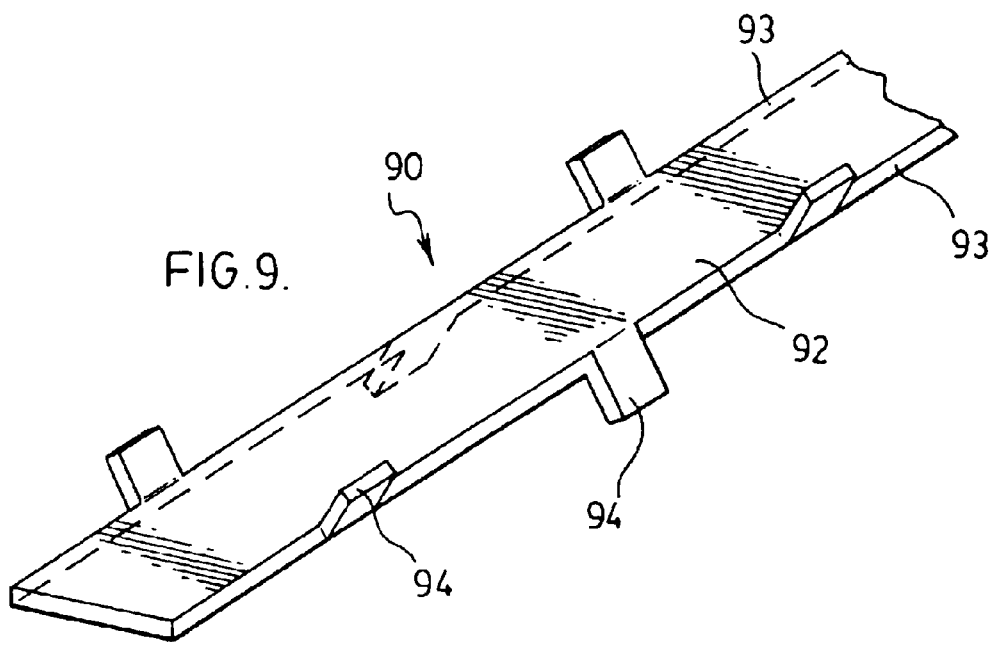
FIG. 9 is an isometric view of the diffuser of FIG. 3.

As indicated by arrow 74 in FIG. 3, the diffuser 90 is inserted into the bore 68 of the distribution bar 62. Referring also to FIG. 9, diffuser 90 is comprised of an elongate body 92 having a centering device that comprises multiple tabs 94. Pairs of tabs 94 extend outwardly from opposing edges 96 of the body 92 at regular intervals along the length thereof. Alternating pairs of tabs 94 are bent at approximately 45 degree angles from the plane of the body 92 in opposing directions so that in an alternating pattern is produced. The pairs of tabs 94 serve to secure the body 92 in a generally centered location in the bore 68.

The diffuser 90 effects spreading of the flowable substance so that the flowable substance fills the bore 68 of the distribution bar 60 and thus, exits the distribution bar 60 evenly through the series of slots 86. The spreading effect is achieved by the impact of the flowable substance on the body 92 of the diffuser 90. The flowable substance is forced to flow along the length of the body 92 and at the same time, is forced to flow to the edges 93 of the diffuser 90. Thus, the flowable substance is essentially evenly distributed along the length of the body 92 as it flows around the edges 93 of the diffuser 90 and out through the series of slots 86.

Referring to FIG. 10, the diffuser 90 is shown in section and the centering effect of the alternating tabs 94 can be seen. The diffuser 90 may be of any construction having an elongate body 92 that is generally centered in the bore 68 of the distribution bar 62. If the inlet holes 84 and outlet slots 86 are not located on opposing surfaces of the distribution bar 62, the diffuser 90 is oriented so as to present a surface, for spreading the flowable substance, between the holes 84 and slots 86.

In an alternate embodiment, the diffuser 90 is a rod that is located in the bore 68. The rod may be secured in the bore 68 using tabs 74 in the manner that has been disclosed.

It will be appreciated by a person skilled in the art that the diffuser 90 may be comprised of any rod or bar having a non-flat surface. A partially porous surface may also be be used. The degree of porousness of the diffuser 90 must be controlled to ensure that the flowable substance does not simply pass through the diffuser 90 from hole 84 straight into slot 86. A surface that is too porous will not spread the liquid between the inlet holes 84 and outlet slots 86, and thus will be ineffective.

In another alternate embodiment, the centering device of the diffuser 90 is a pair of springs that are coupled to the ends of the diffuser 90. The springs are compressed against the inserts 71, which are plugged into the ends of the distribution bar 62, in order to maintain the diffuser 90 generally centered within the bore. In a further embodiment, the springs may be coupled to opposing faces or edges of the diffuser 90 and abut the walls of the bore 68.

FIG. 10 shows the inner cylinder 24, outer cylinder 26 and distribution system 60, which includes the distribution bar 62, feeder bar 64 and diffuser 90, in the assembled condition. The inner cylinder 24 has an internal cavity 96 that extends along the length thereof. The internal cavity 96 is in communication with the flowable substance source via the pipeline 56. The outlets 104 are joined to the internal cavity 96 of the inner cylinder. The outlets 104 abut the distribution bar 60 and form a seal therebetween. The outer cylinder 26 surrounds the inner cylinder 24 and rotates thereabout so that openings 46 are momentarily aligned with the series of slots 86 of the distribution bar 60 in succession.

Passages 98 extend along the length of the inner cylinder 24. A heated medium flows through the passages in order to maintain the flowable substance in a melted state. Heated mediums that are typically used include steam and hot oil, however, any suitable material may be used.

Now that the apparatus has been described, operation of the apparatus to produce sulphur based fertilizer pastilles will now be described.

In operation, the molten fertilizer composition flows under pressure from the source though pipeline 56 to the internal cavity 96 of the inner cylinder 24. The molten fertilizer is forced out of the internal cavity 96 through the outlets 104. The molten fertilizer passes from the outlets 104 into the bore 68 of the distribution bar 62 through holes 84. The molten fertilizer impacts the diffuser 90 and spreads over the length thereof. At the same time, the molten fertilizer flows over the edges 96 of the diffuser 90 so that the molten fertilizer is evenly distributed within the bore 68 of the distribution bar 62. The molten fertilizer then flows out of the slots 86 and fills the feeder slot 65. The void-free molten fertilizer is contained within the feeder slot 65 prior to being extruded through the outer cylinder 26. As the openings 46 of the outer cylinder 26 align with the slots 86, the molten fertilizer is extruded through the openings 46. The molten fertilizer is formed into droplets as the openings 46 of the outer cylinder 26 rotate past the distribution bar 62 to temporarily halt the flow of molten fertilizer through the outer cylinder 26. The droplets fall in rows from the outer cylinder 26 onto the moving conveyor belt 52. The conveyor belt 52 moves the droplets past the cooling device, located underneath moving conveyor belt 52, to form fertilizer pastilles.

The distribution system 60 is effective in receiving the flowable substance through a series of inlet holes 84 and distributing the flowable substance along the length and width of a distribution bar 62 so that it flows essentialy evenly through a series of outlet slots 86. The feeder slot 65 receives the flowable substance from the series of slots 86 and continuously contains a void-free volume of flowable substance under pressure. This void-free volume of flowable substance is then essentially evenly extruded from the openings 46 of the outer cylinder 26 to form pastilles that are generally equal in size. The inlet holes 84 and outlet slots 86 are of a size that is sufficient for clustering and agglomeration of the flowable substance to be unlikely and cleaning of the distribution system 60 can be performed with relative ease.

For cleaning and maintenance purposes, the distribution system 60 is easily removed from the pastillation machine. First, first tension plate 48 is unscrewed and then the outer cylinder 26 is slid towards the second end of the inner cylinder 24. This allows the distribution system 60 to be set free. The outer cylinder 26 does not need to be removed entirely, only withdrawn far enough to allow the distribution system 60 to be removed from channel 100. The end piece 70 is then removed from the distribution system 60 and the diffuser 90 is slid out from the bore 68. The distribution system 60 may then be cleaned or further disassembled in order to perform further cleaning or maintenance. The distribution system 60 is designed so that cleaning without disassembly or removal of the diffuser bar 90 is also highly effective. Typically, the distribution system 60 is immersed in a hot oil bath for cleaning.

Although preferred embodiments of the present invention has been described, those of skill in the art will appreciate that variations and modifications may be made without departing from the spirit and scope thereof as defined by the appended claims.

We claim:

1. In a pastillation machine, an improved distribution system comprising:
    a bar having a bore extending therethrough;
    a series of holes located on an inlet surface of said bar;
    a series of slots located on an outlet surface of said bar;
    a diffuser located in said bore of said bar, said diffuser being spaced between said inlet surface and said outlet surface; and
    wherein said series of holes is aligned with flowable substance outlets of said pastillation machine.

2. The distribution system claimed in claim 1 wherein said bar is comprised of two separate parts that are coupled together.

3. The distribution system claimed in claim 2 wherein said bar is comprised of a distribution bar and a feeder bar, said distribution bar having a bore extending therethrough and being nested in said feeder bar and secured thereto.

4. The distribution system claimed in claim 3 wherein said feeder bar is a softer material than said distribution bar.

5. The distribution system claimed in claim 4 wherein said feeder bar is ductile iron.

6. The distribution system claimed in claim 5 wherein said distribution bar is steel.

7. The distribution system claimed in claim 1 wherein said bore is rectangular in cross-section.

8. The distribution system claimed in claim 1 wherein said inlet surface of said bar is comprised of steel.

9. The distribution system claimed in claim 1 wherein said inlet surface of said bar is comprised of type 316 stainless steel.

10. The distribution system claimed in claim 1 wherein said outlet surface of said bar is comprised of ductile iron.

11. A pastillation machine, said machine comprising:
    a first cylinder having a first end and a second end and an outer surface, said first cylinder being supported at said first end and said second end;
    a cavity formed in said first cylinder, said cavity being in communication with a source of a flowable substance;
    a slot formed in said outer surface of said first cylinder, said slot being located between said first end and said second end;
    fluid outlets located in said slot, said outlets being in communication with said cavity of said first cylinder;
    a second cylinder surrounding said first cylinder and being rotatable thereon, said second cylinder having rows of openings therein;
    a distribution bar sized to fit into said slot and being sandwiched between said inner cylinder and said outer cylinder, said distribution bar having an inlet surface and an outlet surface and a bore extending therethrough;
    a series of holes located on said inlet surface, said holes being aligned with said fluid outlets of said first cylinder for receiving said flowable substance therefrom;
    a series of slots located on said outlet surface, said series of slots of said distribution bar being in communication with said rows of openings in succession;
    a diffuser located between said inlet surface and said outlet surface, said diffuser bar extending axially through said bore of said distribution bar; and
    wherein as said openings of said outer cylinder pass over said series of slots of said distribution bar, a predetermined amount of flowable substance passes through said openings and drops onto a conveyor located below said pastillation machine.

12. A machine as claimed in claim 11 wherein said diffuser further comprises a centering device having a series of tabs extending outwardly from opposing edges of said diffuser.

13. A machine as claimed in claim 12 wherein said tabs are formed in pairs along the length of said diffuser and alternating pairs of said tabs are bent in opposing directions.

* * * * *